(12) United States Patent
Josten et al.

(10) Patent No.: US 7,821,774 B2
(45) Date of Patent: Oct. 26, 2010

(54) MOUNTING BASE WITH ARC PLENUM

(75) Inventors: Harry W. Josten, Grapevine, TX (US); Keith Flowers, Euless, TX (US); Rahul Rajvanshi, Irving, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 162 days.

(21) Appl. No.: 12/362,750

(22) Filed: Jan. 30, 2009

(65) Prior Publication Data

US 2009/0200273 A1    Aug. 13, 2009

Related U.S. Application Data

(60) Provisional application No. 61/027,877, filed on Feb. 12, 2008.

(51) Int. Cl.
*H02B 5/00* (2006.01)
*H01H 33/02* (2006.01)

(52) U.S. Cl. ............... 361/605; 361/601; 174/17 VA; 218/157

(58) Field of Classification Search ............ None
See application file for complete search history.

(56) References Cited

U.S. PATENT DOCUMENTS 6,407,331 B1 * 6/2002 Smith et al. .............. 174/50
6,410,844 B1 * 6/2002 Bruner et al. .......... 174/17 VA
6,417,443 B1 * 7/2002 Smith .................... 174/17 VA
6,924,721 B2 * 8/2005 Afshari et al. ............. 335/202
6,977,354 B1 * 12/2005 Shea et al. ................ 218/157
7,054,143 B2 * 5/2006 Eiselt et al. ............... 361/605
7,236,352 B2 * 6/2007 Dalis ....................... 361/608
7,586,058 B2 * 9/2009 Kozar et al. ............... 218/157

* cited by examiner

*Primary Examiner*—Boris L Chervinsky
(74) *Attorney, Agent, or Firm*—Jose de la Rosa

(57) ABSTRACT

The present invention relates generally to a switchgear apparatus. More particularly, the invention encompasses a mounting base with arc plenum for a switchgear apparatus. The present invention also relates to enclosures for switchgear, panel boards, circuit breakers, and more particularly to an enclosure for low voltage switchgear and switchboard assemblies. The enclosure can be a walk-in type enclosure or a non-walk-in type enclosure. This invention further provides a method and apparatus for channeling plasma (hot arc gasses) that are generated from an arc. The switchgear mounting base with internal arc plenum can be an integral part of an arc resistant switchgear assembly and is preferably located under the switchgear. The switchgear mounting base works in conjunction with a ventilation system in the switchgear apparatus to channel hot arc gasses (plasma) from the lower breaker compartments in the front of the switchgear in the event of an internal arcing fault in one of the breaker compartments. The hot arc gasses exit downward from the bottom of the switchgear and into the plenum. The gasses then are channeled to travel backward through the plenum and then up again into the switchgear rear compartment where they can be routed to and safely discharged from the roof of the switchgear apparatus.

23 Claims, 3 Drawing Sheets

MOUNTING BASE WITH ARC PLENUM

CROSS-REFERENCE TO RELATED APPLICATION

The instant patent application claims priority to and the benefit of the filing date of U.S. Provisional Patent Application Ser. No. 61/027,877, filed on Feb. 12, 2008, titled "Mounting Base With Arc Plenum," the entire disclosure of which is incorporated herein by reference.

FIELD OF THE INVENTION

The present invention relates generally to a switchgear apparatus. More particularly, the invention encompasses a mounting base with arc plenum for a switchgear apparatus. The present invention also relates to enclosures for switchgear, panel boards, circuit breakers, and more particularly to an enclosure for low voltage switchgear and switchboard assemblies. The enclosure can be a walk-in type enclosure or a non-walk-in type enclosure. This invention further provides a method and apparatus for channeling plasma (hot arc gasses) that are generated from an arc. The switchgear mounting base with internal arc plenum can be an integral part of an arc resistant switchgear assembly and is preferably located under the switchgear. The switchgear mounting base works in conjunction with a ventilation system in the switchgear apparatus to channel hot arc gasses (plasma) from the lower breaker compartments in the front of the switchgear in the event of an internal arcing fault in one of the breaker compartments. The hot arc gasses exit downward from the bottom of the switchgear and into the plenum. The gasses then are channeled to travel backward through the plenum and then up again into the switchgear rear compartment where they can be routed to and safely discharged from the roof of the switchgear apparatus.

BACKGROUND INFORMATION

Switchgear and switchboard are general terms which cover metal enclosures, housing switching and interrupting devices, such as, fuses, circuit breakers, relays, along with associated control, instrumentation and metering devices, such as, bus bar, inner connections, and supporting structures, including, assemblies of these devices with associated buses, interconnections and supporting structures used for distribution of electric power.

There are High Voltage switchgear and switchboards, Medium Voltage switchgear and switchboards, and Low Voltage switchgear and switchboards. This invention is primarily geared towards the Low voltage switchgear and switchboards.

Low voltage switchgear and switchboards operate at voltages up to about 635 volts, and with continuous currents that can exceed about 5000 amperes. These Low voltage switchgear and switchboards are designed to withstand short-circuit currents up to about 200,000 amperes.

Low voltage switchgear equipment typically comprises of an assembly composed of multiple metal enclosed sections. Each section may have several circuit breakers stacked one above the other vertically in the front of the section with each breaker being enclosed in its own metal compartment. Each section has a vertical or section bus which supplies current to the breakers within the section via short horizontal branch buses that extend through insulated openings in the rear wall of the breaker compartments. The vertical buses in each section are supplied with current by a horizontal main bus that runs through the line-up. The rear of the section is typically an open area for the routing of cables.

Low voltage switchgear and switchboards are typically designed to withstand the effects of bolted (non-arcing) faults on the load terminals and this capability is validated during Short-Circuit Current and Short-Time Current Withstand Tests in IEEE Standard C37.20.1, the disclosure of which is incorporated herein by reference.

The occurrence of an arcing fault inside the switchgear produces physical phenomena that are different from bolted faults. For example, the energy resulting from an internal arc in air causes a sudden pressure and temperature increase inside the enclosure. Materials involved in or exposed to the arc produce hot decomposition products, both gaseous and particulate, which may be discharged to the outside of the enclosure. This sudden discharge of gaseous and particulate material normally damages the switchgear enclosure and its contents, but may also cause severe injury to an operator who may happen to be nearby.

Arc resistant switchgear qualified to IEEE C37.20.7, the disclosure of which is incorporated herein by reference, is intended to provide an additional degree of protection to the personal performing normal operating duties in proximity to the energized equipment. Accessibility Type 1 arc resistant switchgear has features at the front of the equipment. Accessibility Type 2 arc resistant switchgear has features at the front, sides and rear of the equipment.

Standard metal-enclosed switchgears are designed to withstand the mechanical forces generated by bolted faults on the load terminals until a power circuit breaker or other protective device can interrupt the flow of fault current. This capability is verified by short-circuit and short-time withstand tests on the equipment and interruption tests on the power circuit breakers. During a bolted fault, the voltage at the fault location is essentially zero and the fault energy is dissipated throughout the power system. The arc generated within the power circuit breaker during interruption is cooled and extinguished by the breaker arc chutes. The minimal out gassing of arc byproducts from the arc chutes is contained by the switchgear as verified by interruption tests.

However, it has now been observed that the circuit breaker compartment is also one of the likely places for an arcing fault to occur in switchgear and thus there is a need to address this problem.

An internal arcing fault can be caused by insulation degradation, insulation, contamination, entrance of vermin, foreign objects coming into contact with the energized bus, or any other unplanned condition that creates an electrical discharge path through air. During an arcing fault, the voltage at the fault location is essentially the system voltage and the fault energy is focused within the switchgear enclosure. Arc temperatures can exceed 20,000 degrees Kelvin, rapidly heating the air and vaporizing metal parts. The expanding plasma creates severe mechanical and thermal stress in the equipment which can blow open doors and covers and burn through or fragment the enclosure and/or cause severe injury to an operator who may happen to be nearby.

Thus there is a need in arc resistant switchgear design to provide a means to channel the hot decomposition products created by an internal arcing fault away from the front or the front, sides and rear of the equipment and away from personnel.

There is also a need in many switchgear installations to raise the equipment up off of the floor by the use of a mounting base or housekeeping pad or a sill channel.

This invention overcomes the problems of the prior art and provides a novel method and an apparatus for switchgear assemblies by providing a mounting base with an arc plenum.

PURPOSES AND SUMMARY OF THE INVENTION

The invention is a novel method and an apparatus for switchgear assemblies having a mounting base with an arc plenum.

Therefore, one purpose of this invention is to provide a novel method and an apparatus for switchgear assemblies by providing a mounting base with an arc plenum.

Another purpose of this invention is to provide a channel within a switchgear apparatus for safely and securely channeling of sudden gaseous and particulate discharge occurring from an arcing fault inside the switchgear.

Yet another purpose of this invention is to provide a mounting base for a switchgear apparatus which allows for the safe and secure channeling of a sudden gaseous and particulate discharge occurring from an arcing fault inside the switchgear.

Therefore, one aspect of this invention comprises a mounting base with an integrated arc plenum, comprising:

(a) a front wall having a first end and a second end, a rear wall having a first end and a second end, a first side wall connecting said first end of said front wall to said first end of said rear wall, a second side wall connecting said second end of said front wall to said second end of said rear wall, and forming a mounting base having a central open area;

(b) at least one middle support baffle connecting said first side wall to said second side wall within said central open area, and forming a first arc plenum opening and a second arc plenum opening; and (c) at least one opening in said middle support baffle for the passage of an arc from said first arc plenum opening to said second arc plenum opening, and thereby forming said mounting base with an integrated arc plenum.

Another aspect of this invention comprises a mounting base with an integrated arc plenum for a switchgear, comprising:

(a) a front wall having a first end and a second end, a rear wall having a first end and a second end, a first side wall connecting said first end of said front wall to said first end of said rear wall, a second side wall connecting said second end of said front wall to said second end of said rear wall, and forming a mounting base having a central open area;

(b) at least one middle support baffle connecting said first side wall to said second side wall within said central open area, and forming a first arc plenum opening and a second arc plenum opening;

(c) at least one opening in said middle support baffle for the passage of an arc from said first arc plenum opening to said second arc plenum opening, and thereby forming said mounting base with an integrated arc plenum; and (d) at least one switchgear positioned over said mounting base, said switchgear has at least one first opening and at least one second opening in the base of said switchgear and wherein at least a portion of said at least one first opening in said switchgear base overlaps with at least a portion of said first arc plenum opening, and at least a portion of said second opening in said switchgear base overlaps with at least a portion of said second arc plenum opening, and thereby forming said mounting base with an integrated arc plenum for a switchgear.

BRIEF DESCRIPTION OF THE DRAWINGS

The features of the invention that are novel and the elements characteristic of the invention are set forth with particularity in the appended claims. The drawings are for illustration purposes only and are not drawn to scale. Furthermore, like numbers represent like features in the drawings. The invention itself, both as to organization and method of operation, may best be understood by reference to the detailed description which follows taken in conjunction with the accompanying drawings in which:

DETAILED DESCRIPTION

This invention provides a method and apparatus for an improved switchgear apparatus. This invention further provides arc plenums that are external and under or at the base of the switchgear. This invention also provides arc plenums that are integrated into a sill channel or a mounting base for a switchgear apparatus.

With this invention one can also combine an arc plenum with a mounting base, especially, for a switchgear apparatus. When installed under a compatible switchgear assembly, the mounting base with internal arc plenum vents arc products from the front compartments of the switchgear to the rear compartment of the switchgear by routing them under the switchgear and through the plenum.

Figure 1:
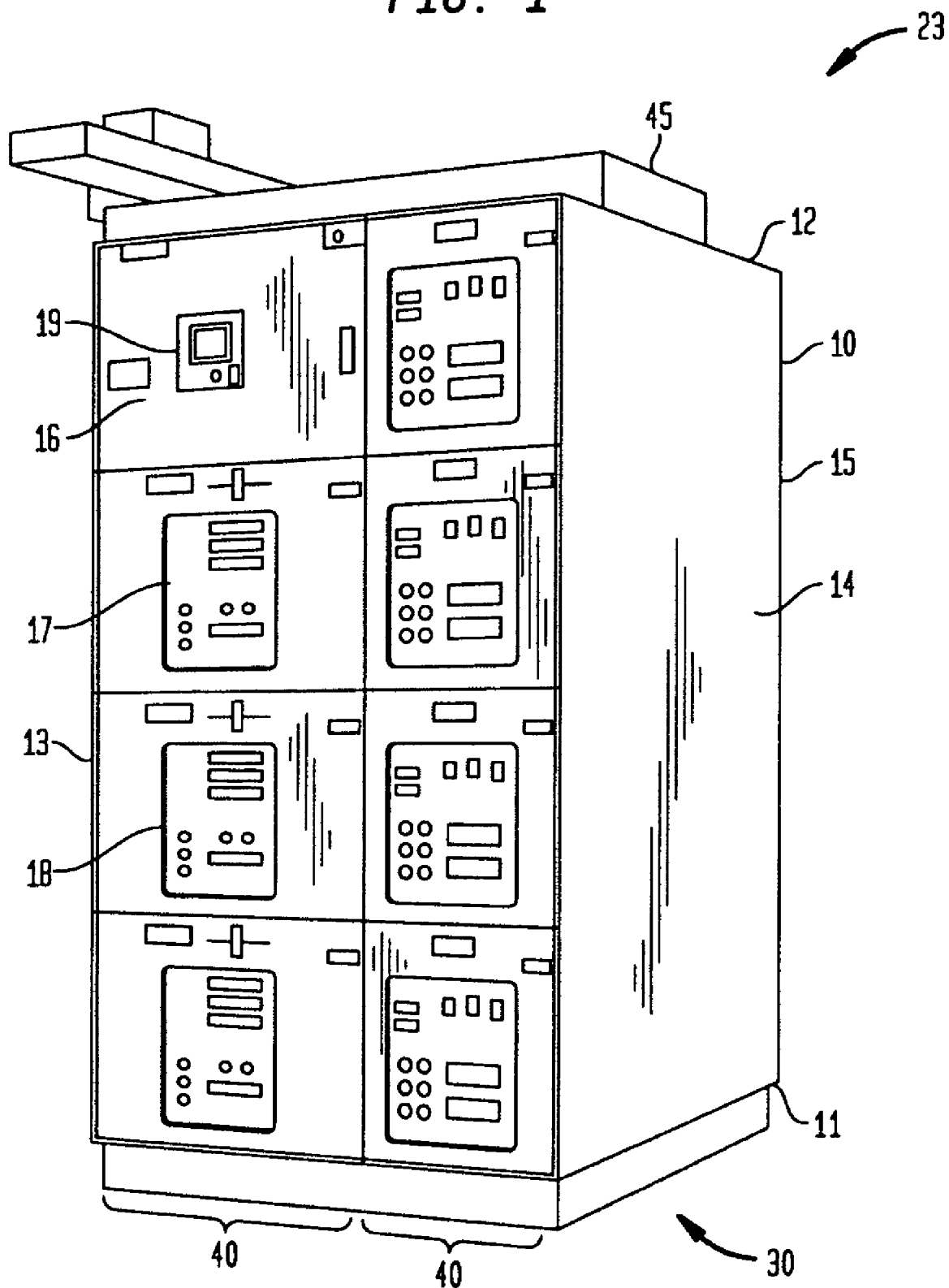
FIG. 1 is a novel switchgear assembly which is used to illustrate an embodiment of the present invention.

FIG. 1 is a novel switchgear assembly 23, which is used to illustrate an embodiment of the present invention. As shown in FIG. 1, the switchgear assembly 23, comprises of a plurality of switchgear sections 40, assembled on at least one mounting base or sill channel 30. Each switchgear section 40, can contain up to six compartments 17, such as, a circuit breaker compartment 17, containing one circuit breaker 18, per each circuit breaker compartment 17. The switchgear assembly 23, further comprises of an enclosure or housing 10, which has a bottom panel or base 11, a top panel or cover 12, a first side panel or cover or wall 13, a second side panel or cover or wall 14, a back panel or cover 15, and a frontal panel or cover or assembly 16. One or more of the compartments 17, may also contain electronic devices or electronic device modules 19. In some situations the breaker compartment may contain an electronic device module 19, instead of a circuit breaker 18. The switchgear assembly 23, is preferably provided with at least one ventilation means or structure 45, in the top panel or cover 12.

Figure 2:
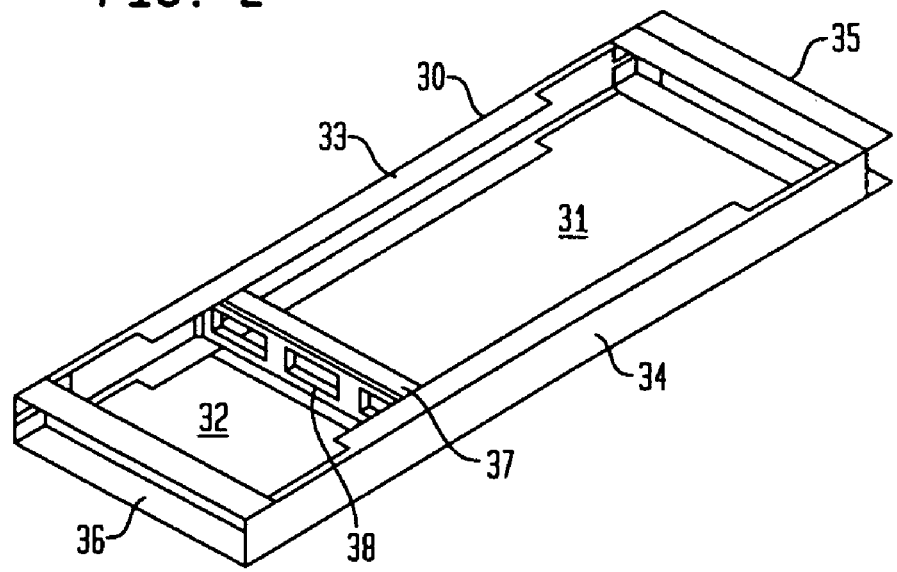
FIG. 2 is a novel mounting base with an internal arc plenum for a switchgear assembly which is used to illustrate an embodiment of the present invention.

FIG. 2 is a novel mounting base with an internal arc plenum 30, for a switchgear assembly 23, which is used to illustrate an embodiment of the present invention. As shown in FIG. 2, the mounting base with an internal arc plenum 30, comprises a first side channel 33, a second side channels 34, a front channel 36, a rear channel 35, and a middle support baffle 37, having at least one orifice or hole or opening 38. The middle support baffle 37, separates a front arc plenum 32, from a rear arc plenum 31. The middle support baffle 37, can be fixedly secured to the first side channel 33, and the second side channel 34, or it could be in a slideable arrangement such that it can be slideably moved along the first side channel 33, and the second side channel 34, so as to increase or decrease the area between the front arc plenum 32, and the rear arc plenum 31.

Figure 3:
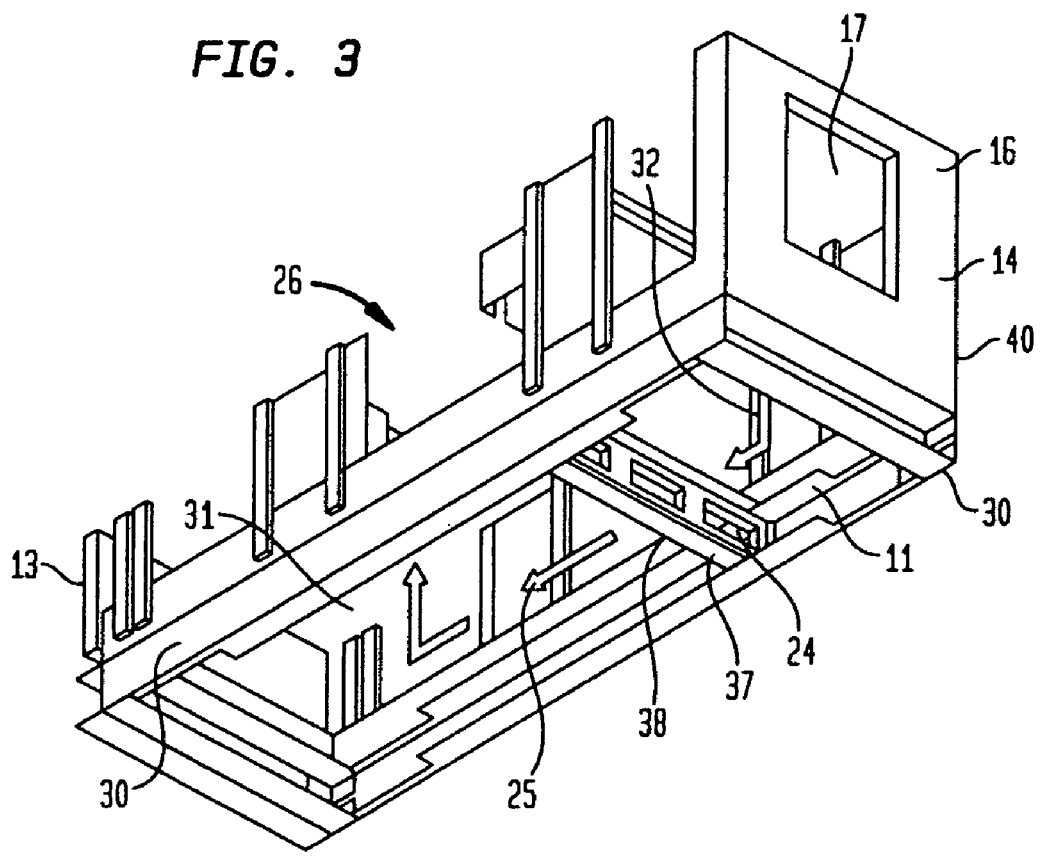
FIG. 3 is a bottom view of an arc resistant switchgear section installed on a mounting base with an internal arc plenum to further illustrate the invention.

FIG. 3 is a bottom view of an arc resistant switchgear section 40, installed on a mounting base with an internal arc plenum 30, to further illustrate the invention. The switchgear section 40, has a frontal opening 24, and a rear opening 26, for the passage of gaseous and particulate discharge 25, as more clearly seen in FIG. 4. A path for the gaseous and particulate discharge 25, in the event of a sudden occurrence of an arcing fault 27, (show in FIG. 4) inside a switchgear section 40, is also shown. The accidental discharge of electrical energy or arc flash 27, which can occur if a foreign object simultaneously contacts two or more primary disconnects, or one or more primary disconnects and a part of the grounded steel enclosure 10. For example, an arc 27, (shown in FIG. 4) occurring in compartment 17, will be channeled from the frontal opening 24, to the front arc plenum 32, and into the rear arc plenum 31, via at least one opening 38, in the middle support baffle 37.

Figure 4:
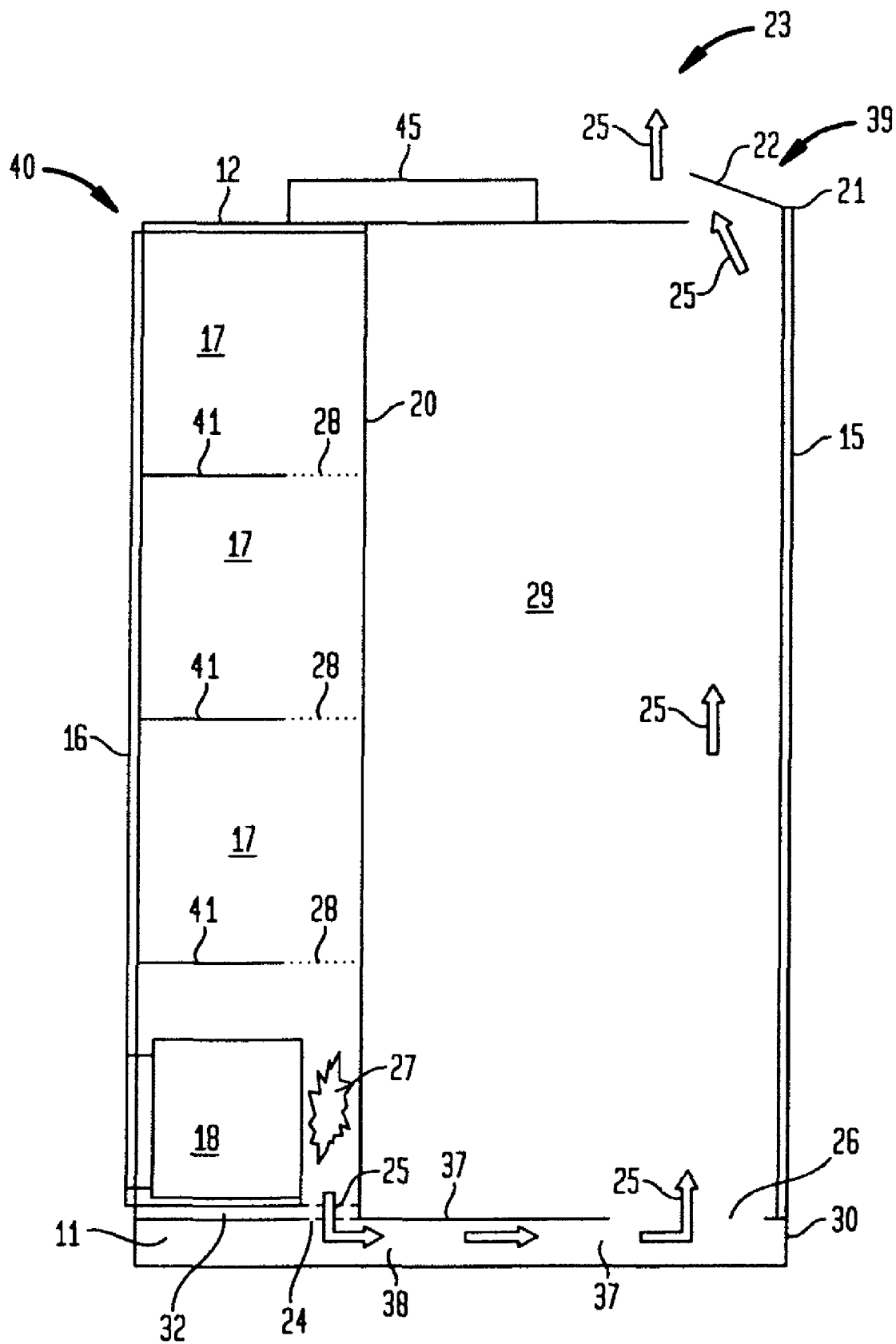
FIG. 4 is a side sectional view of a mounting base with an internal arc plenum for a switchgear assembly which is used to illustrate an embodiment of the present invention.

FIG. 4 is a side sectional view of a mounting base with an internal arc plenum 30, for a switchgear assembly 23, which is used to illustrate an embodiment of the present invention. As shown in FIG. 4, the arc resistant switchgear section 40, has four compartments 17, installed on a mounting base with an internal arc plenum 30. The compartments 17, have ventilation holes 28, preferably in the rear of the compartment's bottom plate 41. A mid-panel 20, separates the compartments 17, from a rear compartment 29. The base or bottom panel 11, preferably has frontal opening 24, and a rear opening 26. When an arcing fault 27, typically an electric arc 27, occurs in the compartment 17, the arc gases or plasma 25, is channeled to exit the compartment 17, through the ventilation holes 28, and then through the front opening 24, in the bottom of the switchgear section 40. The gases and other particulate discharge 25, then is directed to enter the front arc plenum 32, of the mounting base 30, and pass through at least one hole or opening 38, in the middle support baffle 37. The gases and the particulate discharge 25, then passes through the rear arc plenum 31, where it is directed to exit upward through the rear opening 26, and into the rear compartment 29, of the switchgear section 40. The gasses and other particulate discharge 25, then flows upward through the rear compartment 29, of the switchgear section 40, where it is safely discharged to the outside air through a pressure vent 39, which is on the upper or top cover 12, of the switchgear section 40. For some applications the pressure vent 39, may comprise a flap or door 22, which is secured to the top cover 12, via tab or hinge or weakened notch or weakened area 21. The notch or tab or hinge 21, allow the flap or door 22, to pivotally move when a pressure within the rear compartment 29, needs to be released, and to move back to its original position after the pressure has been relieved. However, for some applications one could use a tab or flap 22, that moves from a closed position to an open position to allow for the release of the pressure within the rear compartment 29, and stays there until it is reset to a closed position. The switchgear section 40, may have at least one ventilation means or structure 45. However, for some applications the ventilation means 45, could be combined with the pressure vent 39.

As one can see that with this invention a means to vent hot gasses and other particulates 25, from the circuit breaker compartments 17, in the front of the switchgear section 40, to the rear compartment 29, by routing them underneath the switchgear section 40, is provided. This invention also combines the arc plenum with a mounting base or sill channel 30, with a switchgear section 40.

This invention further provides an arc resistant, enclosure, especially, for low voltage switchgear, and has been designed to provide an additional degree of protection for personnel performing normal operating duties in proximity to the energized equipment. Such duties include opening or closing breakers, closed door racking of breakers, reading of instruments, or other activities that do not require the opening of doors or removal of the covers.

As one can see that with this internal venting system of this invention the arc passage vents and channels the flow of the arc fault gases and plasma, and vents these gases and other related contaminants out of the top of the switchgear and away from the personnel, and even the sill channel has an integrated arc plenum.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A mounting base with an integrated arc plenum, comprising:
 (a) a front wall having a first end and a second end, a rear wall having a first end and a second end, a first side wall connecting said first end of said front wall to said first end of said rear wall, a second side wall connecting said second end of said front wall to said second end of said rear wall, and forming a mounting base having a central open area;
 (b) at least one middle support baffle connecting said first side wall to said second side wall within said central open area, and forming a first arc plenum opening and a second arc plenum opening; and
 (c) at least one opening in said middle support baffle for the passage of an arc from said first arc plenum opening to said second arc plenum opening, and thereby forming said mounting base with an integrated arc plenum.

2. The mounting base with an integrated arc plenum of claim 1, wherein said middle support baffle is positioned to slideably move within said first side wall and said second side wall.

3. The mounting base with an integrated arc plenum of claim 1, wherein said middle support baffle is fixedly positioned between said first side wall and said second side wall.

4. The mounting base with an integrated arc plenum of claim 1, wherein at least one switchgear is positioned over said mounting base, said switchgear has at least one opening in the base of said switchgear and wherein at least a portion of said at least one opening in said switchgear base overlaps with at least a portion of said first arc plenum opening and at least a portion of said second arc plenum opening.

5. The mounting base with an integrated arc plenum of claim 1, wherein at least one switchgear is positioned over said mounting base, said switchgear has at least one first opening and at least one second opening in the base of said switchgear and wherein at least a portion of said at least one first opening in said switchgear base overlaps with at least a portion of said first arc plenum opening, and at least a portion of said second opening in said switchgear base overlaps with at least a portion of said second arc plenum opening.

6. The mounting base with an integrated arc plenum of claim 5, wherein said switchgear has at least one set of ventilation holes to channel the passage of an arc.

7. The mounting base with an integrated arc plenum of claim 5, wherein said switchgear has at least one equipment compartment.

8. The mounting base with an integrated arc plenum of claim 5, wherein said switchgear has at least one equipment compartment, and wherein said equipment compartment accommodates at least one equipment selected from a group consisting of a circuit breaker, an electronic device, and an electronic module.

9. The mounting base with an integrated arc plenum of claim 5, wherein said switchgear has at least one pressure vent opening for the passage of an arc plasma.

10. The mounting base with an integrated arc plenum of claim 5, wherein said switchgear has at least one pressure vent opening for the passage of an arc plasma, and wherein said at least one pressure vent opening is located on the upper surface of said switchgear.

11. The mounting base with an integrated arc plenum of claim 5, wherein said switchgear has at least one pressure vent for the passage of an arc plasma, and wherein said at least one pressure vent is secured to said switchgear via at least one securing means.

12. The mounting base with an integrated arc plenum of claim 5, wherein said switchgear has at least one pressure vent for the passage of an arc plasma, and wherein said at least one pressure vent is secured to said switchgear via at least one securing means, and wherein said securing means are selected from a group consisting of a tab, a hinge, a weakened notch and a weakened area.

13. A mounting base with an integrated arc plenum for a switchgear, comprising:
  (a) a front wall having a first end and a second end, a rear wall having a first end and a second end, a first side wall connecting said first end of said front wall to said first end of said rear wall, a second side wall connecting said second end of said front wall to said second end of said rear wall, and forming a mounting base having a central open area;
  (b) at least one middle support baffle connecting said first side wall to said second side wall within said central open area, and forming a first arc plenum opening and a second arc plenum opening;
  (c) at least one opening in said middle support baffle for the passage of an arc from said first arc plenum opening to said second arc plenum opening, and thereby forming said mounting base with an integrated arc plenum; and
  (d) at least one switchgear positioned over said mounting base, said switchgear has at least one first opening and at least one second opening in the base of said switchgear and wherein at least a portion of said at least one first opening in said switchgear base overlaps with at least a portion of said first arc plenum opening, and at least a portion of said second opening in said switchgear base overlaps with at least a portion of said second arc plenum opening, and thereby forming said mounting base with an integrated arc plenum for a switchgear.

14. The mounting base with an integrated arc plenum for a switchgear of claim 13, wherein said middle support baffle is positioned to slideably move within said first side wall and said second side wall.

15. The mounting base with an integrated arc plenum for a switchgear of claim 13, wherein said middle support baffle is fixedly positioned between said first side wall and said second side wall.

16. The mounting base with an integrated arc plenum for a switchgear of claim 13, wherein at least one switchgear is positioned over said mounting base, said switchgear has at least one opening in the base of said switchgear and wherein at least a portion of said at least one opening in said switchgear base overlaps with at least a portion of said first arc plenum opening and at least a portion of said second arc plenum opening.

17. The mounting base with an integrated arc plenum for a switchgear of claim 13, wherein said switchgear has at least one set of ventilation holes to channel the passage of an arc.

18. The mounting base with an integrated arc plenum for a switchgear of claim 13, wherein said switchgear has at least one equipment compartment.

19. The mounting base with an integrated arc plenum for a switchgear of claim 13, wherein said switchgear has at least one equipment compartment, and wherein said equipment compartment accommodates at least one equipment selected from a group consisting of a circuit breaker, an electronic device, and an electronic module.

20. The mounting base with an integrated arc plenum for a switchgear of claim 13, wherein said switchgear has at least one pressure vent opening for the passage of an arc plasma.

21. The mounting base with an integrated arc plenum for a switchgear of claim 13, wherein said switchgear has at least one pressure vent opening for the passage of an arc plasma, and wherein said at least one pressure vent opening is located on the upper surface of said switchgear.

22. The mounting base with an integrated arc plenum for a switchgear of claim 13, wherein said switchgear has at least one pressure vent for the passage of an arc plasma, and wherein said at least one pressure vent is secured to said switchgear via at least one securing means.

23. The mounting base with an integrated arc plenum for a switchgear of claim 13, wherein said switchgear has at least one pressure vent for the passage of an arc plasma, and wherein said at least one pressure vent is secured to said switchgear via at least one securing means, and wherein said securing means are selected from a group consisting of a tab, a hinge, a weakened notch and a weakened area.

* * * * *